(12) United States Patent
Swasey et al.

(10) Patent No.: US 10,533,663 B2
(45) Date of Patent: Jan. 14, 2020

(54) BIMETALLIC STATIC GASKET AND METHOD OF CONSTRUCTION THEREOF

(71) Applicant: TENNECO INC, Lake Forest, IL (US)

(72) Inventors: Thomas W. Swasey, Okemos, MI (US); Carl Schenten, Clarkston, MI (US); Mark Bowman, Elk Grove Village, IL (US); John Sas, Grayslake, IL (US); Rolf Prehn, Wipperfuerth (DE); Carlos Santiago, Deerfield, MI (US); Tim O'Keefe, Mt. Prospect, IL (US); Michael Shirilla, Chicago, IL (US); Thomas O. Zurfluh, Evanston, IL (US); Kyle T. Roberts, Hickory, NC (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 15/371,426

(22) Filed: Dec. 7, 2016

(65) Prior Publication Data
US 2017/0082197 A1    Mar. 23, 2017

Related U.S. Application Data

(62) Division of application No. 12/854,626, filed on Aug. 11, 2010, now Pat. No. 9,518,660.
(Continued)

(51) Int. Cl.
*F16J 15/08* (2006.01)

(52) U.S. Cl.
CPC ...... *F16J 15/0825* (2013.01); *F16J 2015/085* (2013.01); *F16J 2015/0868* (2013.01); *F16J 2015/0875* (2013.01); *Y10T 29/49826* (2015.01)

(58) Field of Classification Search
CPC .......... F16J 2015/085; F16J 2015/0868; F16J 2015/0875; Y10T 29/49826
(Continued)

(56) References Cited

U.S. PATENT DOCUMENTS 4,285,527 A * 8/1981 Connely ................ F16J 15/123
                                                           277/595
4,873,415 A * 10/1989 Johnson ................. B23K 26/24
                                                           219/121.63
(Continued)

FOREIGN PATENT DOCUMENTS

CN            1313911 A       9/2001
CN          101365902 A       2/2009

*Primary Examiner* — Eugene G Byrd
(74) *Attorney, Agent, or Firm* — Robert L. Stearns; Dickinson Wright, PLLC

(57) ABSTRACT

A static gasket and method of construction thereof is provided. The gasket includes a functional layer constructed of one type of metal having an opening bounded by an inner periphery an outer periphery. The gasket further includes a carrier layer constructed of a different metal than the functional layer. The carrier layer has an opening bounded by an inner periphery configured to receive the outer periphery of the functional layer in a line-to-line or loose fit. The functional layer is configured in substantially coplanar relation with the carrier layer with a first portion of the outer periphery of the functional layer being welded to a radially aligned first portion of the inner periphery of the carrier layer. A second portion of the outer periphery of the functional layer remains detached from a radially aligned second portion of the inner periphery of the carrier layer.

3 Claims, 3 Drawing Sheets

Related U.S. Application Data

(60) Provisional application No. 61/233,003, filed on Aug. 11, 2009.

(58) Field of Classification Search
USPC .................. 277/592, 593, 594, 598, 313
See application file for complete search history.

(56) References Cited

U.S. PATENT DOCUMENTS

| | | | | |
|---|---|---|---|---|
| 5,230,521 A * | 7/1993 | Ueta | ............... | F02F 11/002 277/595 |
| 5,378,001 A * | 1/1995 | Miyaoh | ............... | F16J 15/0825 277/595 |
| 5,472,217 A * | 12/1995 | Hagiwara | ............ | F16J 15/0825 277/596 |
| 5,628,113 A * | 5/1997 | Tanaka | ............... | F02F 11/002 277/595 |
| 5,628,518 A * | 5/1997 | Ushio | ............... | F16J 15/0825 277/593 |
| 5,890,719 A * | 4/1999 | Bettencourt | ............ | F02F 11/002 277/599 |
| 5,938,208 A * | 8/1999 | Yoshida | ............... | F16J 15/0818 277/592 |
| 5,979,906 A * | 11/1999 | Silvian | ............... | F16J 15/0825 277/593 |
| 6,152,456 A * | 11/2000 | Ziegler | ............... | F02F 11/002 277/593 |
| 6,409,178 B1 * | 6/2002 | Raden | ............... | F02F 11/002 277/317 |
| 6,422,572 B1 * | 7/2002 | Ueda | ............... | F16J 15/0825 277/591 |
| 6,422,573 B1 * | 7/2002 | Sekioka | ............... | F16J 15/0818 277/594 |
| 6,485,028 B1 * | 11/2002 | Smith | ............... | F02F 11/002 277/598 |
| 6,506,503 B1 | 1/2003 | Mergen et al. | | |
| 6,758,479 B2 * | 7/2004 | Miyaoh | ............... | F16J 15/0818 277/592 |
| 6,779,800 B2 * | 8/2004 | Udagawa | ............ | F16J 15/0818 277/592 |
| 7,070,187 B2 * | 7/2006 | Boeve | ............... | F02F 11/002 277/598 |
| 7,726,662 B2 * | 6/2010 | Foster | ............... | F16J 15/0825 277/592 |
| 8,186,690 B2 * | 5/2012 | Imai | ............... | F16J 15/0825 277/595 |
| 2001/0048201 A1 * | 12/2001 | Hegmann | ............ | F02F 7/0073 277/591 |
| 2002/0170521 A1 * | 11/2002 | Hilgert | ............... | F16J 15/0818 123/193.5 |
| 2005/0093247 A1 * | 5/2005 | Udagawa | ............ | F16J 15/0825 277/593 |
| 2005/0140096 A1 * | 6/2005 | Golombek | ............ | F16J 15/0825 277/594 |
| 2005/0151326 A1 * | 7/2005 | Wade | ............... | F02F 11/002 277/592 |
| 2005/0194749 A1 * | 9/2005 | Udagawa | ............ | F16J 15/0825 277/592 |
| 2007/0138429 A1 | 6/2007 | Hutchens et al. | | |
| 2008/0023922 A1 * | 1/2008 | Umehara | ............ | F16J 15/0825 277/592 |
| 2009/0166985 A1 * | 7/2009 | Hohe | ............... | F16J 15/0818 277/592 |
| 2011/0101626 A1 * | 5/2011 | Prehn | ............... | F16J 15/0818 277/592 |

\* cited by examiner

FIG. 2A
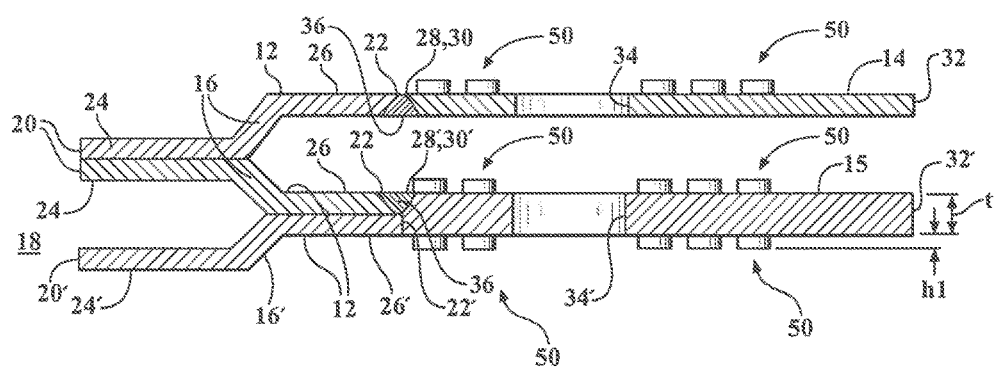
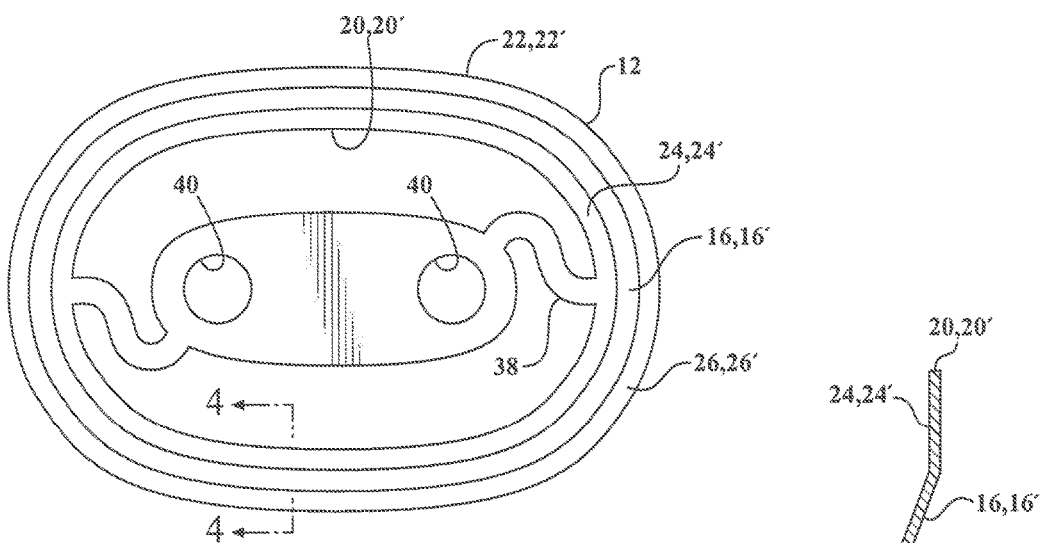
FIG. 3
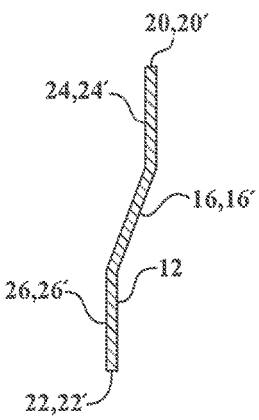
FIG. 4

US 10,533,663 B2

BIMETALLIC STATIC GASKET AND METHOD OF CONSTRUCTION THEREOF

CROSS-REFERENCE TO RELATED APPLICATIONS

This divisional application claims the benefit of U.S. Utility application Ser. No. 12/854,626, filed Aug. 10, 2010, which claims the benefit of U.S. Provisional Application Ser. No. 61/233,003, filed Aug. 11, 2009, both of which are incorporated herein by reference in their entirety.

BACKGROUND OF THE INVENTION

1. Technical Field

This invention relates generally to static gaskets of the type used to establish a gas/fluid-tight seal between two members to be clamped together, and more particularly to exhaust manifold gaskets.

2. Related Art

In establishing a gas/fluid-tight seal between two members to be clamped together, such as between cylinder block and engine block or an exhaust manifold and engine block, it is common to use a static gasket having a single layer of a single piece of material, or a plurality of stacked layers overlying one another formed as a multilayer gasket. Generally, at least one of the layers of the multilayer gasket, sometimes referred to as a functional layer, has a seal bead to facilitate establishing a gas/fluid tight seal about an opening. The functional layer needs to be fabricated of a material suitable for establishing and maintaining the gas/fluid tight seal, and further, typically needs to be able to withstand high temperature environments. As such, the functional layer material needs to constructed from a high quality metal, typically coming at a relatively high cost. As such, use of the high cost functional layer material increases the overall cost of the gasket, and in addition, typically results in high cost waste material.

In addition, to minimized the possibility of over compressing the seal bead of the functional layer, a stopper layer in a multilayer gasket needs to be constructed of a predetermined thickness material to ensure the bead or beads remain functional. Unfortunately, metal sheet material typically used as stopper layer material is produced having a generally wide thickness tolerance, such as about +/−0.001", and thus, it can be difficult to tightly control the stopper height, wherein the stopper height is provided by the material thickness. As such, to avoid over compression of the seal bead in the functional layer, the manufacturer typically errors on the side of having a thicker stopper layer than may be necessary in order to account for inherent manufacturing tolerance fluctuations. Unfortunately, this also adds cost to the gasket assembly.

SUMMARY OF THE INVENTION

A static gasket for providing a gas/fluid tight seal between a members to be clamped together is provided. The gasket includes at least one metal functional layer constructed of one type of metal with each functional layer having an opening bounded by an inner periphery configured to register circumferentially with an opening to be sealed and having an outer periphery. The gasket further includes at least one metal carrier layer constructed of a different metal than the at least one functional layer. Each carrier layer has an opening bounded by an inner periphery configured to receive the outer periphery of the at least one functional layer in a line-to-line or loose fit. The at least one functional layer is configured in substantially coplanar relation with the at least one carrier layer with a first portion of the outer periphery of the at least one functional layer being welded to a radially aligned first portion of the inner periphery of the at least one carrier layer via a butt weld joint. A second portion of the outer periphery of the at least one functional layer remains detached from a radially aligned second portion of the inner periphery of the at least one carrier layer.

In accordance with another aspect of the invention, the carrier layer has a material thickness established between opposite planar surfaces with at least one of the planar surfaces having raised projections formed of the carrier metal material, wherein the raised projections provide a thickness across the opposite planar surfaces that is greater than the material thickness of the carrier metal layer.

According to one aspect of the invention, the functional layer has an embossed sealing bead extending circumferentially about its opening and the carrier layer is substantially flat.

According to another aspect of the invention, the carrier layer has at least one through passage radially outwardly from and adjacent its opening for receipt of a swaging tool during assembly.

According to another aspect of the invention, weld joints formed radially inwardly of the carrier layer through passage attach the first and second layers to one another.

According to another aspect of the invention, the gasket has a pair of carrier layers overlying one another with at least one of the functional layers attached to each carrier layer, thereby providing a multilayer gasket assembly.

In accordance with yet another aspect of the invention, a method of constructing a static gasket is provided. The method includes providing first and second layers of metal constructed of different types of metal from one another and forming the first layer into a functional layer having an opening configured to register circumferentially with an opening to be sealed and having an outer periphery and forming the second layer into a carrier layer having an opening bounded by an inner periphery configured to receive the outer periphery of the functional layer therein. Further, disposing the outer periphery of the functional layer in the opening of the carrier layer such that the functional layer is in substantially coplanar relation with the carrier layer. Further yet, biasing a portion of the inner periphery of the carrier layer into abutment with a radially aligned portion of the outer periphery of the functional layer, and then, welding the portion of the inner periphery of the carrier layer to the radially aligned portion of the outer periphery of the functional layer.

According to another aspect of the invention, the method further includes forming a plurality of raised projections about the opening in the carrier layer and, disposing the outer periphery of the functional layer in the opening of the carrier layer.

According to another aspect of the invention, the method further includes coining the raised projections.

According to another aspect of the invention, the method further includes extruding the raised projections.

According to another aspect of the invention, the method further including fixing the outer periphery of the functional layer to the inner periphery of the carrier layer by forming a weld joint extending therebetween.

According to another aspect of the invention, the method further includes forming a through passage adjacent the opening in the carrier layer and swaging the carrier layer to bring the inner periphery of the carrier layer into abutment with the outer periphery of the functional layer prior to forming the weld joint therebetween.

According to yet another aspect of the invention, the method includes providing a pair of carrier layers overlying one another and attaching at least one of the functional layers to each carrier layer to provide a multilayer gasket assembly.

According to yet another aspect of the invention, the method further includes fixing the pair of carrier layers to one another radially outwardly from the openings formed therein.

According to yet another aspect of the invention, the method further includes fixing a pair of the functional layers to a single one of the carrier layers.

According to yet another aspect of the invention, the method further includes forming sealing beads in the functional layers.

According to yet another aspect of the invention, the method includes forming the functional layer with a relatively high cost gasket quality metal and forming the carrier layer with a relatively low cost metal.

BRIEF DESCRIPTION OF THE DRAWINGS

These and other aspects, features and advantages of a static gasket constructed in accordance with the invention will become more readily appreciated when considered in connection with the following detailed description of presently preferred embodiments and best mode, appended claims and accompanying drawings, in which:

FIG. 2A is a cross-sectional side view taken generally along line 2A-2A of FIG. 1;

FIG. 3 is plan view of a sealing portion of the gasket of FIG. 1 prior to attaching the sealing portion to a non-sealing portion of the gasket;

FIG. 4 is a cross-sectional side view taken generally along line 4-4 of FIG. 3;

DETAILED DESCRIPTION OF PRESENTLY PREFERRED EMBODIMENTS

Figure 1:
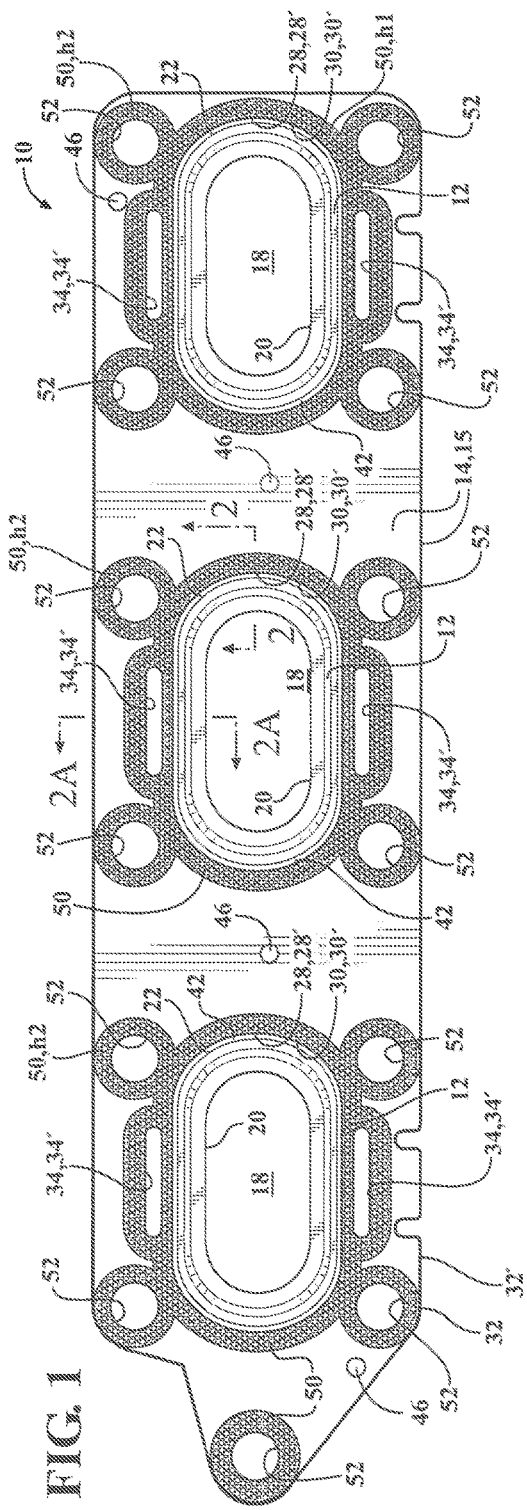
FIG. 1 is a perspective view of an exhaust manifold gasket assembly constructed in accordance with one aspect of the invention.

Referring in more detail to the drawings, FIG. 1 illustrates a bimetallic static gasket assembly 10, referred to hereafter as gasket, constructed in accordance to one aspect of the invention. The gasket 10 can be constructed as a single layer gasket of dissimilar first and second materials welded to one another, or as shown here, by way of example and without limitation, as a multilayer gasket. The gasket 10 has at least one, and shown here as three functional layer inserts, also referred to as functional layers or first layers 12, and at least one, and shown here as a pair of carrier layers, also referred to as second layers 14, 15. The carrier layer or layers 14, 15 can be configured to carry a plurality of the functional layers 12 spaced laterally from one another at different locations of the carrier layers 14, 15 depending on how many openings need to be sealed in the application. Respective ones of the functional layers 12 and carrier layers 14, 15 are fixed to one another in planar or substantially planar relation with one another, wherein the functional layers 12 have sealing beads, represented here as half beads 16, by way of example, to establish a gas/fluid tight seal about an opening 18 to be sealed, such as between an engine block and an exhaust manifold, for example, wherein the carrier layers 14, 15 function to carry and locate the functional layers 12 during assembly. With the functional layers 12 acting to establish the seal about the opening 18 or openings 18 to be sealed, the material used to construct the functional layers 12 is a high quality gasket metal, such as a spring steel, stainless steel or other high temperature alloy, for example. Accordingly, the material used to construct the functional layers 12 is relatively expensive compared to more standard, low grade steel material. In contrast, with the carrier layers 14, 15 acting as carriers of the functional layers 12, the material used to construct the carrier layers is a comparatively low cost metal, such as a low grade steel or aluminum, for example. Accordingly, the material used to construct the carrier layers 14, 15 is relatively inexpensive in comparison to the material used to construct the functional layers 12. As such, the gasket 10 provides an ability to form a reliable seal about the openings 18, while at the same time being economical in manufacture, having low cost material working in combination with high cost material, and in use. In addition, the cost associated with the waste generated for the high cost material is minimized, further reducing the cost associated with manufacture of the gasket 10.

Figure 2:
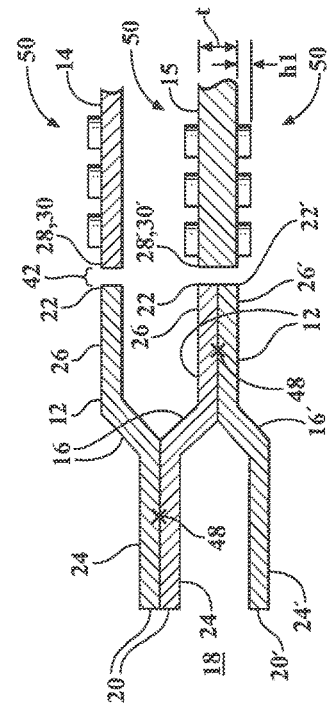
FIG. 2 is a cross-sectional side view taken generally along line 2-2 of FIG. 1.

The functional layers 12, being constructed from a resilient metal, such as spring steel, for example, are provided having a thickness of about 0.1 to 0.3 mm, for example. Two of the functional layers 12, as shown in FIG. 2, by way of example and without limitation, are constructed having mirrored profiles to one another. Each functional layer 12 has an inner periphery 20 configured to register concentrically and in axial alignment with the opening 18 and an outer periphery 22 with half beads 16 extending between the inner and outer peripheries 20, 22. The half beads 16 converge toward one another into abutment with one another along inner plateau regions 24 adjacent the inner periphery 20 and diverge away from one another to outer plateau regions 26 spaced axially from one another a predetermined distance adjacent the outer periphery 22. The third functional layer 12, shown in FIG. 2 as being the lowermost functional layer 12, is constructed having a mirrored profile in relation to the adjacent, intermediate sandwiched functional layer 12. Accordingly, the lowermost functional layer 12 has an inner periphery 20' configured to register concentrically and in axial alignment with the opening 18 and an outer periphery 22' with a half bead 16' extending between the inner and outer peripheries 20', 22'. The half beads 16, 16' of the intermediate and lowermost functional layers 12 diverge away from one another to respective inner plateau regions 24, 24' adjacent the inner peripheries 20, 20' and converge toward one another into abutment with one another along outer plateau regions 26, 26' adjacent the outer peripheries 22, 22'. The combined functional layers 12, and thus their inner plateau regions 24, 24', have a combined total thickness that is substantially the same as the thickness of the single carrier layer 15.

As shown in FIG. 2, the uppermost carrier layer 14 has an opening 28 bounded by an inner periphery 30 configured to receive the outer periphery 22 of the functional layer 12 in close, line-to-line or slightly loose relation therein and an outer periphery 32 (FIGS. 1 and 2A). To facilitate fixing the functional layer 12 to the carrier layer 14, discussed in further detail below, the carrier layer 14 has at least one, and shown here as a pair of through passages 34 adjacent the inner periphery 30 and shown here as being diametrically across the opening 28, for example. The through openings 34 extend a predetermined distance generally parallel to the inner periphery 30, and are preferably elongate and generally rectangular in shape.

The lowermost carrier layer 15 is generally shaped the same as the uppermost carrier layer 14, however, for reasons discussed hereafter, has a slightly increased thickness (t) in comparison to the uppermost second layer 14. As such, the lowermost carrier layer 15 has an opening 28' bounded by an inner periphery 30' configured to receive the outer peripheries 22, 22' of the intermediate and lowermost functional layers 12 in close, line-to-line or slightly loose relation therein and an outer periphery 32'. To facilitate fixing the functional layer 12 to the carrier layer 15, the carrier layer 15 has at least one, and shown here as a pair of through passages 34' adjacent the inner periphery 30' and shown here as being diametrically across the opening 28' and configured to register with the through openings 34 in the uppermost carrier layer 14.

Figure 5A:
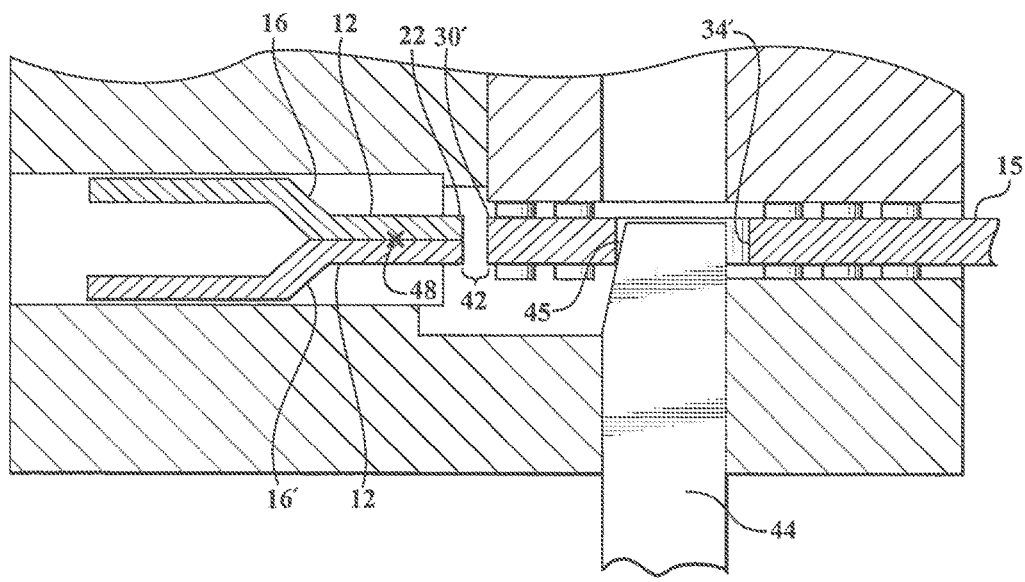
FIG. 5A is a partial view of a swaging tool being used in construction of a gasket constructed in accordance with one aspect of the invention with the swaging tool shown in a pre-engaged position.
Figure 5B:
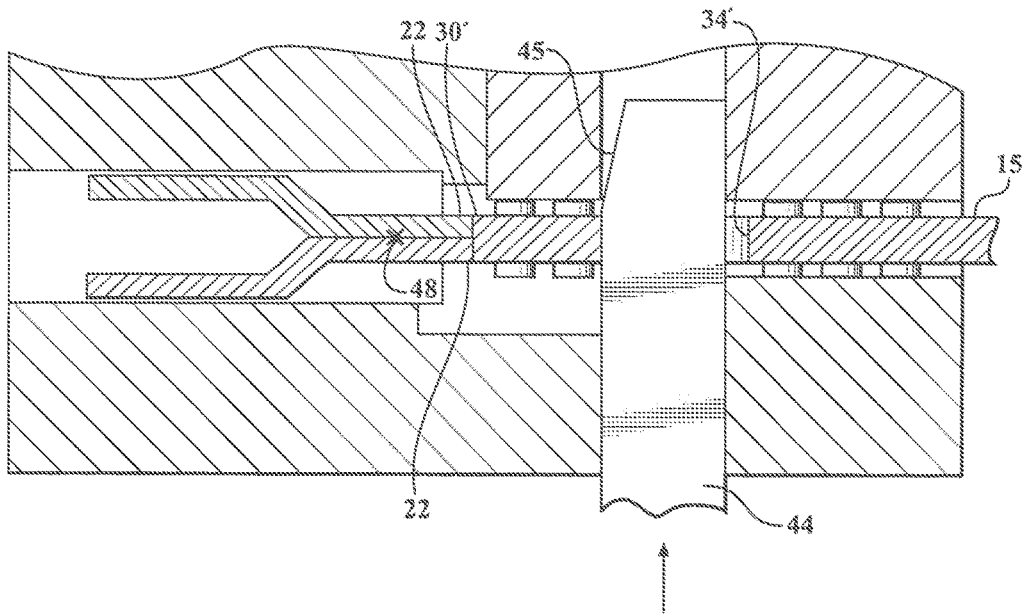
FIG. 5B is a view similar to FIG. 5A showing the swaging tool in an engaged position.

To complete the construction of the gasket 10, upon forming the features discussed above in the individual layers 12, 14, 15, the functional layers 12 are disposed in the openings 28, 28' of the carrier layers 14, 15 so that the outer peripheries 22, 22' are received within the inner peripheries 30, 30' of the carrier layers 14, 15. Upon being disposed therein, the outer plateau regions 26, 26' of the functional layers 12 are configured in coplanar or substantially coplanar relation with the respective carrier layers 14, 15, as shown. The outer peripheries 22, 22' of the functional layers 12 are brought into a close, line-to-line or a slightly loose fit relative to the inner peripheries 30, 30' of the carrier layers 14, 15, such that a gap 42 between about 0.000-0.010", for example, is established there between. Then, upon positioning the functional layers 12 within the openings 28, 28' of the carrier layers 14, 15, as shown in FIG. 5A (showing only carrier layer 15 being welded to mirrored intermediate and lowermost functional layers 12, wherein the same process is used to weld the carrier layer 14 to the uppermost functional layer 12), a swaging tool 44 having a camming surface 45 is inserted into the through passages 34 to bias a first portion of the inner peripheries 30, 30' located radially inwardly and in radial alignment with the through passages 34 into abutment with adjacent first portions of the outer peripheries 22, 22' of the functional layers 12 (FIG. 5B, swaging tool 44 engaged). Accordingly, the first portions of the carrier layers 14, 15 are plastically biased radially inwardly into abutment with radially aligned first portions of the functional layers 12, while the second portions (portions other than those plastically biased by the swaging tool 44) of the carrier layers 14, 15 remain unbiased and spaced with radially aligned second portions of the functional layers 12. Then, as shown in FIG. 2A, weld joints, such as laser weld joints 36 are formed to fix the respective first portions of the inner peripheries 30, 30' of the carrier layers 14, 15 to the first portions of the outer peripheries 22, 22' of the functional layers 12, while the circumferentially outlying second portions of the functional layers 12 and the carrier layers 14, 15 remain detached from one another, such that the gaps 42 remain therebetween. The resulting laser butt weld joints 36 can be formed using a continuous or pulse laser process, as desired. Further, the butt weld joints 36 can be formed as continuous or intermittent weld joints. In addition to the weld joints 36 fixing the functional layers 12 to the carrier layers 14, 15, additional weld joints, such as laser spot weld joints 46, for example, can be formed to fix the separate, overlying carrier layers 14, 15 to one another at selected locations to form the unitized gasket assembly 10, such that the functional layers 12 and carrier layers 14, 15 are all fixed to one another. Further yet, additional weld joints, such as laser spot weld joints 48, for example, can be formed to fix abutting portions of the functional layers 12 to one another. The spot weld joints 48 are shown in FIG. 2 as being formed between the inner plateau regions 24 and also between the outer plateau regions 26, 26'. The functional layers 12 can be welded to one another prior to or after being welded to the carrier layers 14, 15.

In accordance with another aspect of the invention, to prevent over-compression of the beads 16 of the functional layer 12, the carrier layer 14 has a plurality of raised projections 50 extending about the openings 18, wherein the projections 50 are formed having a predetermined, tight tolerance height (h1) to prevent the beads 16 from being completely flattened upon compressing the gasket 10 between the surfaces to be sealed. Further, the raised projections 24 can be formed about fastener openings 52 having a predetermined, tight tolerance height (h2) to facilitate creating the desired load distribution through the gasket 10. The projections 50 are formed extending about or substantially about the openings 28, 28', wherein the projections 50 can be formed with their height (h1) being constant, wherein the height is measured from the planar surface adjacent from which the projections 50 extend outwardly from to a peak of the projections 50, or their height (h1) can vary about the openings 28, 28', either continuously or in predetermined sectors, to achieve a predetermined compression distribution applied to the half beads 16 of the functional layers 12. It should be recognized that the projections 20 can be formed to extend from one side, such as shown for the upper carrier layer 14, or from both of the sides, such as shown for the lower carrier layer 15, depending on the application and construction of the gasket 10.

The projections 50 are formed by upsetting the material of the carrier layers 14, 15, such as in a coining or extruding process, for example. The projections 50, aside from being able to formed of constant heights or varying heights (h1), can be formed having any desired geometric shape, such that when viewed from overhead, can be circular, square, rectangular, hexagonal, pyramidal, or any other suitable shape.

In addition to the projections 50 formed about the openings 28, 28', projections 50 are also formed about the fastener openings 52. The projections 50 formed about the fastener openings 52 can be formed having the same height as the height of the projections 50 formed about the openings 28, 28', such that h2 is equal to h1, or the heights can be different, such that h2 is different from h1. Accordingly, precise control can be obtained for the clamping load throughout the gasket 10, thereby maximizing the ability to maintain a gas/fluid tight seal about the openings 18 to be sealed.

With the projections 50 limiting the degree of compression applied to the beads 16, 16', the thickness t1 of the sheet material used to construct the carrier layers 14, 15 can be the same as or substantially the same as the thickness of the material used to construct the functional layers 12. Accordingly, the cost of the material used to construct the carrier layers 14, 15 can be minimized. Further, with the projections 50 providing a stopper limiting the degree of compression to the beads 16, 16', the stopper has a tightly controlled tolerance, thereby allowing the compression of the beads 16, 16' to be tightly controlled, thus, further facilitating the formation of a gas/fluid tight seal. It should be recognized that the processes used to produce the projections 50 can provide a very tight tolerance for the height of the projections 50 that is significantly tighter than the tolerance of the material thickness t1.

In accordance with another aspect of the invention, to facilitate orienting the functional layers 12 relative to the carrier layers 14, 15 prior to establishing the weld joints 36, the functional layers 12 can be formed having an inner webbing 38 extending across the opening 18 between the diametrically opposite portions of the inner periphery 20, 20'. The webbing 38 is for assembly purposes only, and is subsequently removed upon assembly, such as in a laser cutting process, for example. The webbing has a pair of locator openings 40 formed therein, wherein the locator openings 40 are configured for receipt of a locator fixture or posts therein. Upon disposing the locator posts in the locator openings 40, the functional layers 12 are automatically aligned properly within the openings 28, 28' of the carriers 14, 15. As such, the welding process, including swaging and subsequent welding can then be performed. Upon forming the weld joints 36, the webbing 38 can then be removed, as discussed above, such as in a laser cutting process.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a static gasket, comprising:
    providing first and second layers of metal constructed of different types of metal from one another;
    forming the first layer into a functional layer having an opening configured to register circumferentially with an opening to be sealed and having an outer periphery;
    forming the second layer into a carrier layer having an opening bounded by an inner periphery configured to receive the outer periphery of the functional layer therein;
    disposing the outer periphery of the functional layer in the opening of the carrier layer such that the functional layer is in substantially coplanar relation with the carrier layer;
    biasing a portion of the inner periphery of the carrier layer into abutment with a radially aligned portion of the outer periphery of the functional layer;
    welding the portion of the inner periphery of the carrier layer to the radially aligned portion of the outer periphery of the functional layer;
    forming a pair of functional layers having outer peripheries received in a single carrier layer inner periphery; and
    forming a pair of carrier layers and arranging the pair of carrier layers in spaced, overlying relation with one another.

2. The method of claim 1 further including forming a third functional layer configured in mirrored relation to an adjacent one of the pair of functional layers and welding the third functional layer to a carrier layer spaced in overlying relation with the single carrier layer.

3. The method of claim 2 further including welding the third functional layer to an adjacent one of the pair of functional layers.

* * * * *